(12) United States Patent
Tidey

(10) Patent No.: US 7,339,140 B2
(45) Date of Patent: *Mar. 4, 2008

(54) ROASTER OVEN HAVING LID WITH HINGED PORTION

(75) Inventor: Scott Tidey, Richmond, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/425,018

(22) Filed: Jun. 19, 2006

(65) Prior Publication Data

US 2006/0289427 A1   Dec. 28, 2006

Related U.S. Application Data

(63) Continuation of application No. 10/941,589, filed on Sep. 14, 2004, now Pat. No. 7,064,297.

(51) Int. Cl.
 *F27D 11/00* (2006.01)
 *A47J 37/10* (2006.01)
(52) U.S. Cl. ............ 219/429; 219/249; 219/385; 219/386; 99/422; 99/423; 99/426; 126/275 R; 220/379; 220/744
(58) Field of Classification Search ........ 219/249, 219/386, 385; 99/429, 422, 423, 426; 126/275 R; 220/379, 744
See application file for complete search history.

(56) References Cited

U.S. PATENT DOCUMENTS

| 646,283 | A | 3/1900 | Heatly et al. |
|---|---|---|---|
| 677,466 | A | 7/1901 | Ortner |
| 697,472 | A | 4/1902 | Giessel |
| 950,844 | A | 3/1910 | Dolan |
| 984,318 | A | 2/1911 | Thomas |
| 1,083,718 | A | 1/1914 | Wright |
| 1,230,419 | A | 6/1917 | Lowe |
| 1,724,244 | A | 8/1929 | Wisenor |
| 2,428,839 | A | 10/1947 | Di Salino |
| 2,747,388 | A | 5/1956 | Dolar |
| 2,770,389 | A | 11/1956 | Drakoff |
| 2,870,932 | A | 1/1959 | Davis |
| 5,111,956 | A | 5/1992 | Jow |
| 6,234,067 | B1 | 5/2001 | Schmidt |
| D448,238 | S | 9/2001 | Schmidt |
| 6,460,453 | B1 | 10/2002 | Frauenfeld |

*Primary Examiner*—Shawntina Fuqua
(74) *Attorney, Agent, or Firm*—Akin Gump Strauss Hauer & Feld LLP

(57) ABSTRACT

A roaster oven for the heating of foodstuffs includes an outer housing with an opening and a heating element disposed proximate an interior surface for heating thereof. A lid, removably positioned on the outer housing to at least partially cover the opening, has a stationary portion and a hinged portion pivotably mounted thereto. The hinged portion is pivotable with respect to the stationary portion about at least one hinge. The hinged portion has an open position in which at least a portion of the interior surface is accessible and a closed position in which the lid substantially covers the opening.

12 Claims, 4 Drawing Sheets

ROASTER OVEN HAVING LID WITH HINGED PORTION

CROSS-REFERENCE TO RELATED APPLICATIONS

This patent application is a continuation application of U.S. patent application Ser. No. 10/941,589, filed Sep. 14, 2004, now U.S. Pat. No. 7,064,297, entitled "Roaster Oven Having Lid with Hinged Portion" and is incorporated herein by reference.

BACKGROUND OF THE INVENTION

The present invention relates generally to roaster ovens, and, more particularly, to a roaster oven having a lid with a hinged portion that can be opened without removal of the lid.

Roaster ovens are generally well known and are typically used for the cooking of foodstuffs therein. Such roaster ovens typically include a base having an interior compartment and a heating element for the heating of the interior compartment. Typically, the roaster oven has a removable lid for the covering of the interior compartment in order to retain heat and moisture.

When tending to or serving the foodstuffs, the removable lid must be completely removed from the base and placed on a surface, such as a countertop, a tabletop, or the like. Depending on the amount of time the lid was covering the roaster oven during cooking of the foodstuffs, the lid can become hot and condensation can form on an inside surface thereof. Additionally, the inside surface of the lid generally collects spattered foodstuffs and/or other foodstuff residue. When set on a surface, the heated condensation and foodstuff residue tends to drip off of the lid and collect on the surface, making it necessary to clean up the pooled liquid and foodstuff residue from the surface. Depending on the surface, such a pooling of liquid and foodstuff residue could potentially cause damage thereto.

For this reason, it would be desirable to have a roaster oven with a lid having a portion that can be opened in order to gain access to the interior of the roaster oven without having to remove the entire lid from the oven base. In this way, additional cleanup of and/or damage to surfaces can be avoided.

BRIEF SUMMARY OF THE INVENTION

Briefly stated, the present invention is a roaster oven for the heating of foodstuffs comprising an outer housing having a bottom wall and a sidewall extending upwardly therefrom to define a cavity. A rim extends inwardly from the sidewall to define an opening to access the cavity. An interior surface contacts and contains foodstuffs positioned within the cavity. The interior surface is accessible through the opening. A heating element is disposed proximate the interior surface for heating the interior surface. A control mechanism is operably connected with the heating element to enable a user to control the temperature of the heating element. A lid is removably positioned on the rim to at least partially cover the opening. The lid has a stationary portion and a hinged portion pivotably mounted to the stationary portion. The hinged portion is pivotable with respect to the stationary portion about at least one hinge. The hinged portion has an open position in which at least a portion of the interior surface is accessible and a closed position in which the lid substantially covers the opening.

BRIEF DESCRIPTION OF THE SEVERAL VIEWS OF THE DRAWINGS

The foregoing summary, as well as the following detailed description of the preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

Figure 1:
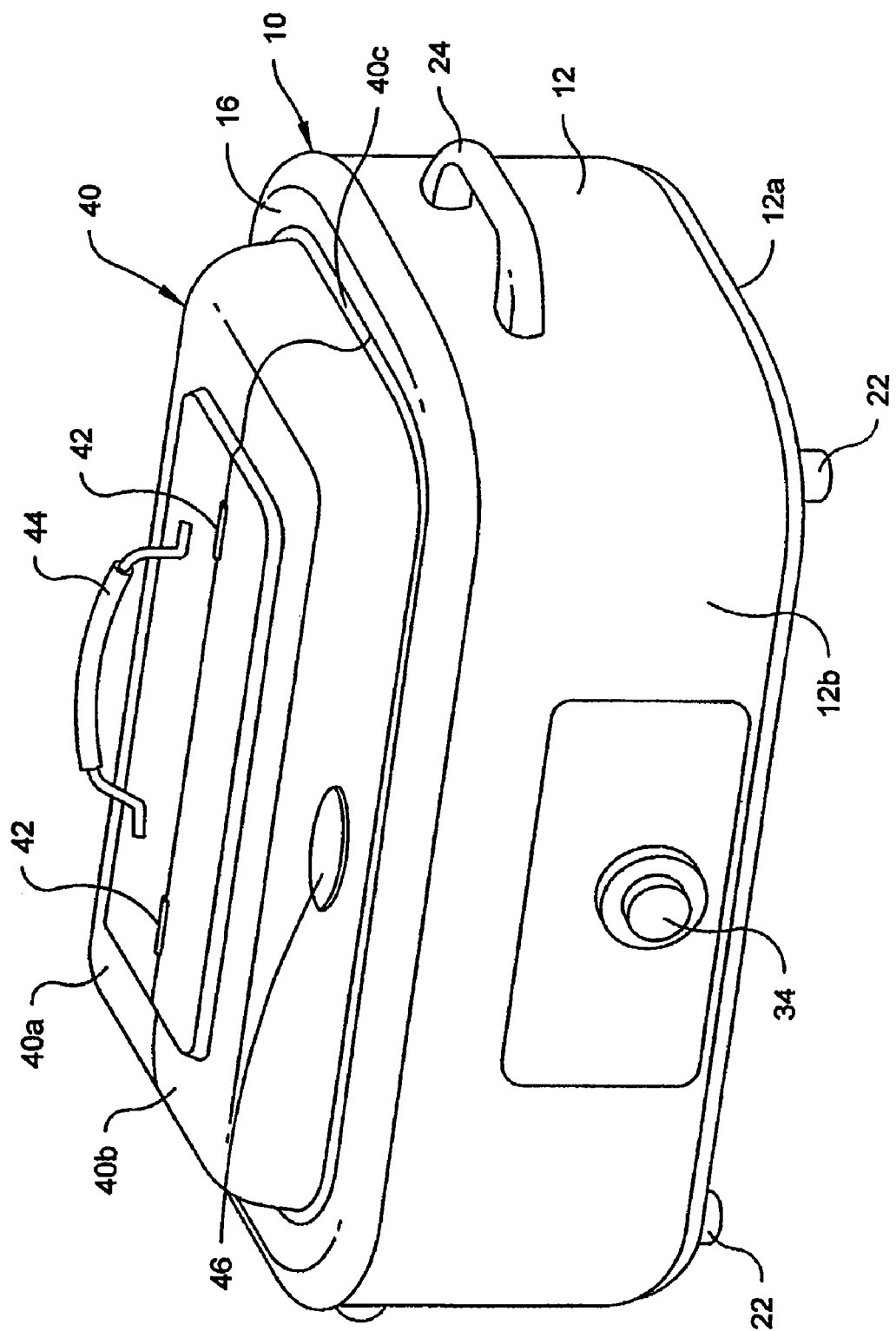
FIG. 1 is a front right perspective view of a roaster oven in accordance with a preferred embodiment of the present invention with a lid in a closed position.

Certain terminology is used in the following description for convenience only and is not limiting. The words "right," "left," "upper," and "lower" designate directions in the drawings to which reference is made. The terminology includes the words above specifically mentioned, derivatives thereof, and words of similar import.

Referring to the drawings in detail, wherein like numerals indicate like elements throughout, there is shown in FIGS. 1-4 a roaster oven, indicated generally at 10, having a lid 40 in accordance with the present invention.

Figure 4:
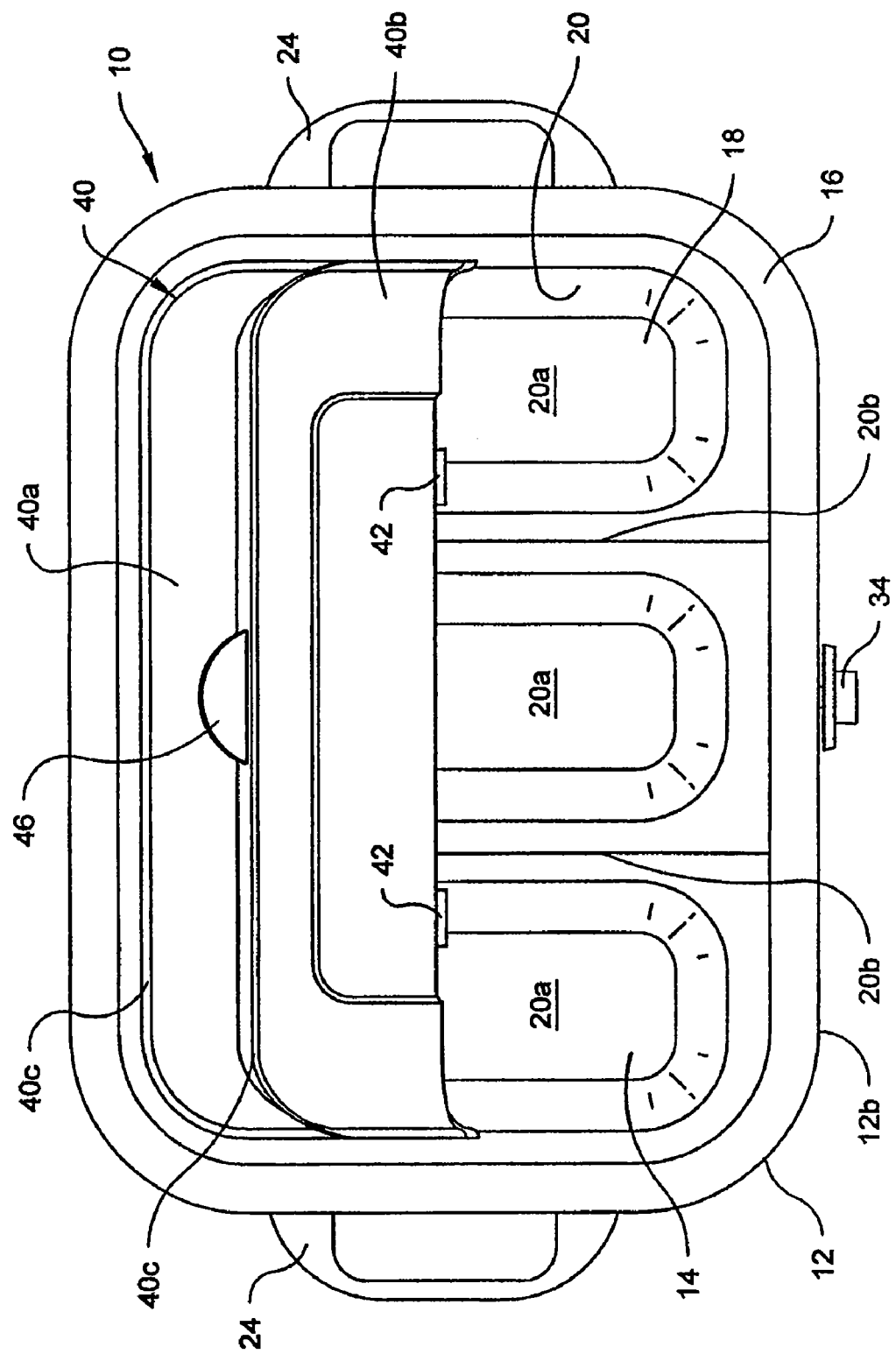
FIG. 4 is a top plan view of the roaster oven of FIG. 2.

Referring to FIGS. 1 and 4, the roaster oven 10 is used for the heating and/or cooking of foodstuffs (not shown), and includes a generally rectangular outer housing 12 having rounded corners, when viewed from above or below. The outer housing 12 has a generally rectangular bottom wall 12a with a side wall 12b extending upwardly from an outside edge of the bottom wall 12a. Preferably, the outer housing 12 is constructed from a thin sheet metal, such as steel, for example, although it is within the spirit and scope of the present invention that the outer housing 12 be made from any substance capable of performing in the manner discussed below.

Generally U-shaped handles 24 are oppositely disposed on the outer housing 12, extending outwardly therefrom to facilitate carrying of the roaster oven 10 by a user. Additionally, the roaster oven 10 has feet 22 extending downwardly from the bottom wall 12a of the outer housing 12 for supporting the roaster oven 10 on top of a surface (not shown), such as a table top, countertop, or the like, so that the bottom wall 12a of the roaster oven 10 is spaced a distance from the surface. Preferably, the feet 22 are generally cylindrical in shape and disposed proximate the rounded corners of the outer housing 12. Although portrayed as having four feet 22, it is within the spirit and scope of the present invention that there be more or less than four feet 22 and that they be disposed at locations other than proximate the corners of the housing 12. Additionally, the shape of the feet 22 is not limited to being cylindrical and can be of any shape capable of performing the function of supporting the roaster oven 10 above the surface.

Figure 2:
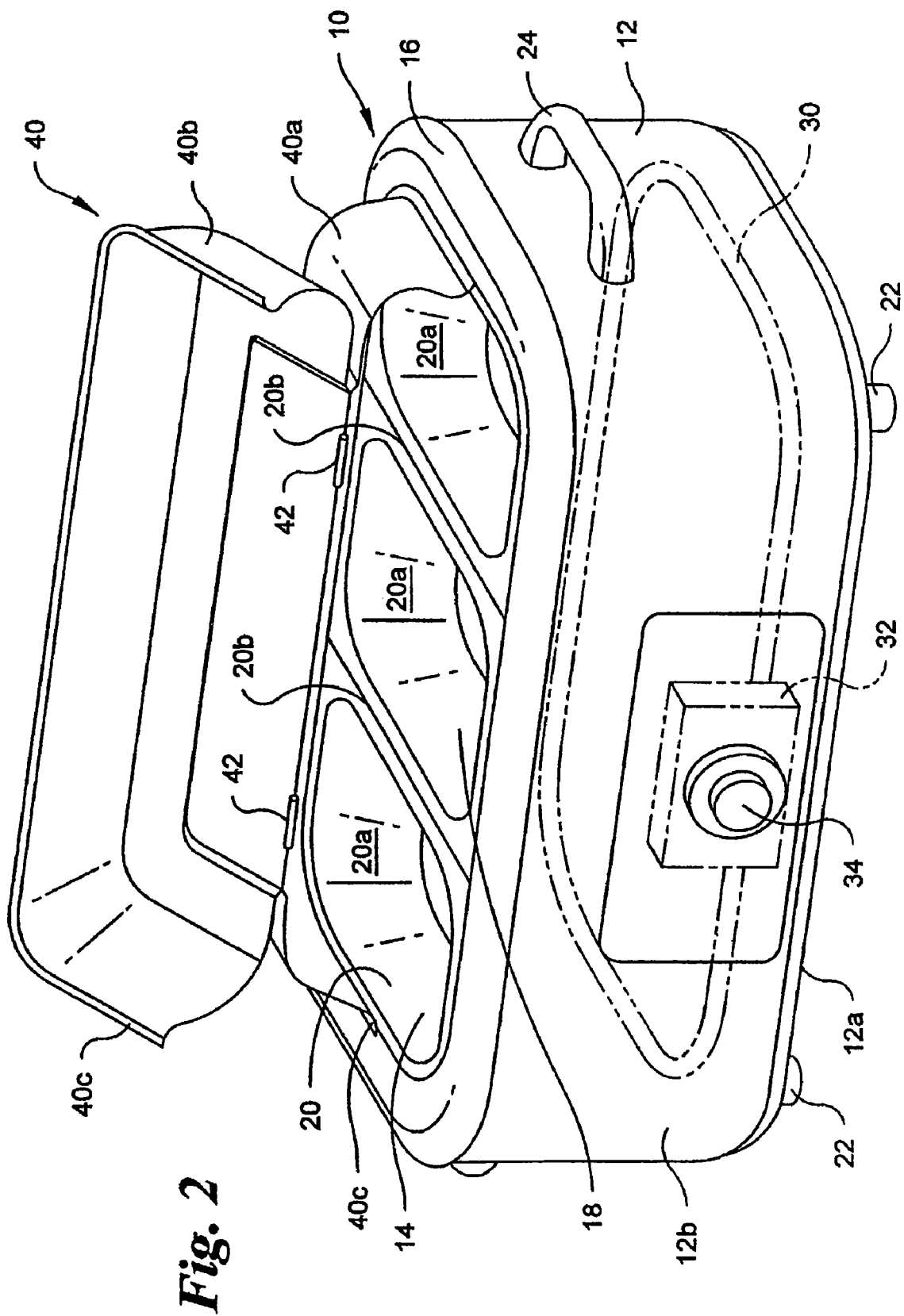
FIG. 2 is a front right perspective view of the roaster oven of FIG. 1 with the lid in an open position.

Referring now to FIGS. 1 and 2, the bottom wall 12a and the side wall 12b cooperate to define a cavity 14 therein. A rim 16 extends inwardly from the side wall 12b to circumscribe and define an opening 18 through which the cavity 14 can be accessed. The cavity 14 has an interior surface 20 for contact with and containment of foodstuffs positioned within the cavity 14. The interior surface 20 is also accessible through the opening 18. Preferably, the interior surface 20 has a plurality of compartments 20a for separating foodstuffs during heating. The plurality of compartments 20a are separated by interior walls 20b there between to inhibit the commingling of foodstuffs. The compartments 20a are preferably supported at edges thereof by at least the rim 16, although it is contemplated that sides and bottom sides of the compartments 20a also be supported by abutting portions of the cavity 14. Although the roaster oven 10 is portrayed as having three separate compartments 20a, it is within the spirit and scope of the present invention that there be more or less than three compartments 20a. It is preferable that the individual compartments 20a are removable from the roaster oven 10 to facilitate cleaning thereof. In this way, the compartments 20a can be removed from the roaster oven 10 in order to clean the compartments 20a either by hand washing or using a dishwasher, such that the compartments 20a can be cleaned without having to submerge or otherwise dampen the rest of the roaster oven 10. It is further preferable that the individual compartments 20a be separate from one another to enable each compartment 20a to be individually removed from the roaster oven 10 and/or individually cleaned, although it is contemplated that the individual compartments 20a be joined together to form an interior surface 20 constructed from a single piece of material and having a plurality of compartments 20a. Preferably, the interior surface 20 is constructed from a thin sheet metal, such as steel, for example, although it is within the spirit and scope of the present invention that the interior surface 20 be made from any substance capable of performing in the manner discussed below. It is further contemplated that the interior surface 20 have a non-stick coating thereon to further facilitate the cleaning thereof, although this is not intended to be limiting.

Figure 3:
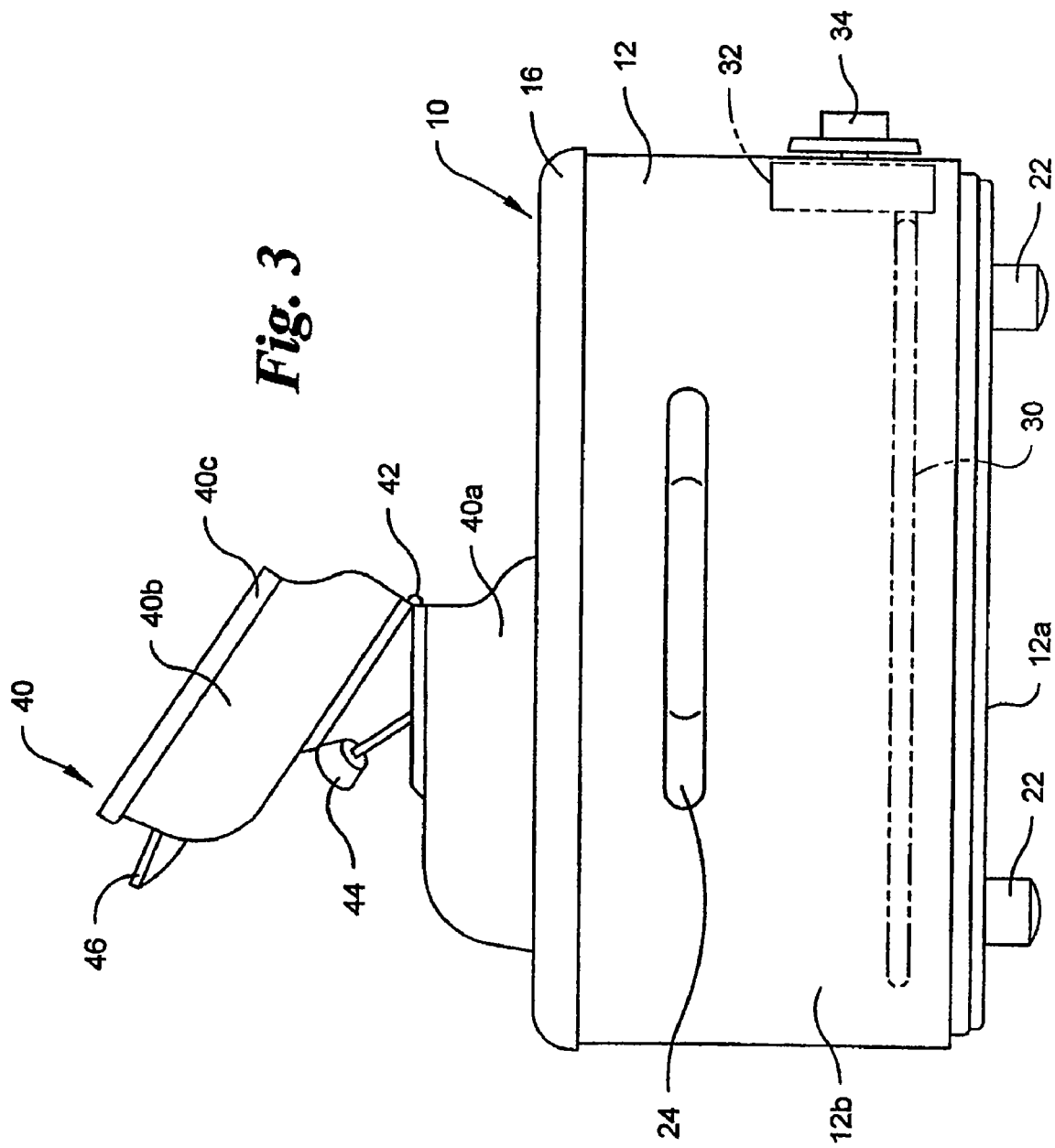
FIG. 3 is a left side elevational view of the roaster oven of FIG. 2.

Referring to FIGS. 2 and 3, a heating element 30 is disposed within the cavity 14 of the roaster oven 10, disposed proximate the interior surface 20. The heating element 30 is preferably made of a conductive metal formed into a tubular shape and bent into a loop appropriately sized for fitting within the roaster oven 10. When electricity is passed through the heating element 30, heat radiates therefrom. The heating element 30 is preferably disposed below a bottom of the interior surface 20, although it is within the spirit and scope of the present invention that the heating element 30 also be disposed proximate sides of the interior surface 20.

The heating element 30 is selectively electrically heated in order to heat the interior surface 20 and foodstuffs located thereon. A control mechanism or thermostat 32 is operably connected with the heating element 30 to enable the user to control the temperature of the heating element 30 and thus the temperature of the foodstuffs in the compartments 20a. Preferably, the thermostat 32 is disposed within the cavity 14 of the outer housing 12 proximate the side wall 12b with a knob 34 extending outwardly from the thermostat 32, through the side wall 12b, and accessible to the user to enable the user to set the temperature of the heating element 30 through manipulation of the knob 34. Also, it is preferred that the knob 34 be used to turn the heating element 30 on and off. Preferably, the control knob 34 extends outwardly from a front side of the outer housing 12 of the roaster oven 10.

Referring to FIGS. 1, 2, and 4, the lid 40 of the roaster oven 10 is removably positioned on the rim 16 to at least partially cover the opening 18. The lid 40 has a stationary portion 40a and a movable hinged portion 40b which is pivotably mounted to the stationary portion 40a. The hinged portion 40b is pivotable with respect to the stationary portion 40a about at least one hinge 42. Preferably, the lid 40 has two hinges 42, although it is within the spirit and scope of the present invention that there be more or less than two hinges 42. The lid 40 is generally rectangular with rounded corners, when viewed from above or below, and is cut along a line to divide the lid 40 into the stationary and hinged portions 40a, 40b. Preferably, the lid 40 is cut along a longitudinal line generally along the center of the lid 40 such that the stationary portion 40a is substantially a first half of the lid 40 and the hinged portion 40b is substantially a second half of the lid 40. Although this is preferred, it is within the spirit and scope of the present invention that the lid 40 be divided into stationary and hinged portions 40a, 40b along any line as long as the lid 40 is still able to function as described below. Preferably, the lid 40 is constructed from a thin sheet metal, such as steel or aluminum, for example, although it is within the spirit and scope of the present invention that the lid 40 be made from any substance capable of performing in the manner discussed below.

The lid 40 has a closed position (FIG. 1) in which the lid 40 substantially covers the opening 18. In the closed position, a bottom edge 40c of the lid 40 abuts the rim 16 of the outer housing 12 to substantially close the opening 18, thereby covering the entire interior surface 20. The lid 40 also has an open position (FIG. 2) in which at least a portion of the interior surface 20 is accessible. To place the lid 40 in the open position, the user pivots the hinged portion 40b about the hinges 42 while keeping the stationary portion 40a in abutting relationship with the rim 16 of the outer housing 12. In this way, approximately half of the opening 18 is exposed to enable the user to access the interior surface 20 without having to completely remove the lid 40.

Referring to FIG. 3, the stationary portion 40a of the lid 40 has a first lid handle 44 for lifting the entire lid 40, such as during placement of the lid 40 on or removal of the lid 40 from the roaster oven 10, for instance. When in the open position, the first lid handle 44 also acts as a stop surface against which the hinged portion 40b is rested. Additionally, the hinged portion 40b has a second lid handle 46 extending outwardly from the hinged portion 40b. The second lid handle 46 enables the user to open the hinged portion 40b of the lid 40 without coming into contact with the lid 40 itself, which tends to become hot during use of the roaster oven 10. Although the second lid handle 46 is portrayed as extending outwardly from a front of the hinged portion 40b, it is within the spirit and scope of the present invention that the second lid handle 40b extend outwardly from any portion of the hinged portion 40b, such as from a top of the hinged portion 40b proximate the front, for instance, as long as the second lid handle 46 can still perform its intended function, as described above.

Although the above-described configuration of the lid 40 is preferred, it is within the spirit and scope of the present invention that the stationary portion 40a and the hinged portion 40b have different configurations from that described above. For example, alternatively, the hinged portion could be a rectangular panel cut from the top of the lid and pivotably attached to the remaining ring-shaped portion of the lid using hinges. In this way, the stationary portion would include the ring-shaped portion of the lid, an entire bottom edge of which would remain in contact with the rim 16 of the roaster oven 10 during both open and closed positions. The hinged portion would include the rectangular panel, which could be opened to access at least a portion of the interior surface 20 of the roaster oven 10.

In use, the user places foodstuffs to be heated and/or cooked into the compartments 20a of the interior surface 20. The user then places the lid 40 on the rim 16 of the outer housing 12 to close the opening 18 of the roaster oven 10. The user turns on the heating element 30 using the control knob 34 to set the heating element 30 to the appropriate temperature, as regulated by the thermostat 32. During heating/cooking of the foodstuffs, the user can periodically tend to the foodstuffs within the roaster oven 10 by opening the hinged portion 40b to place the lid 40 in the open position, as shown in FIGS. 2-4. In this way, a portion of the interior surface 20 is exposed, allowing the user to tend to the foodstuffs within the compartments 20a. The hinged portion 40b can be maintained in the open position by resting the hinged portion on the first lid handle 44. In this position, the hinged portion 40b is maintained in an inclined position so that any condensation or foodstuff residue that has collected on an inside of the hinged portion 40b will simply run off of the hinged portion and drip into the interior surface 20. When the user is finished tending to the foodstuffs within the roaster oven 10, the user can then pivot the hinged portion 40b downwardly to place the lid 40 back in the closed position to cover the opening 18 and continue warming and/or cooking of the foodstuffs. Also, the hinged portion 40b can be opened to allow people to serve foodstuffs directly from the roaster oven 10 without having to completely remove the lid 40 from the roaster oven 10. Upon completion of the cooking of foodstuffs, the cooked foodstuffs are removed from within the compartments 20a of the roaster oven 10, and the roaster oven 10 is turned off using the knob 34. Any excess foodstuffs are removed from the compartments 20a, and the compartments 20a are removed from the roaster oven 10. The compartments 20a can now be cleaned separately from the rest of the roaster oven 10. In this way, the user can either hand wash the compartments 20a or use a dishwasher to do so without having to submerge the rest of the roaster oven 10 in water or otherwise dampen the roaster oven 10.

The lid 40 of the present invention overcomes the problems of the lids of the prior art by not requiring the user to completely remove the lid 40 from the roaster oven 10 in order to access the foodstuffs within the roaster oven 10. By not requiring the lid 40 to be completely removed from the roaster oven 10 anytime the user wishes to access the interior surface 20, the likelihood that condensation and foodstuff residue will drip off of the lid 40 and collect on a surface is diminished. Instead, any condensation and/or foodstuff residue tends to drip off of the lid 40 and into the compartments 20a. In this way, additional cleanup of and/or damage to surfaces can be avoided. Additionally, by enabling access to the interior surface 20 of the roaster oven 10 without necessitating the complete removal of the lid 40, an increased amount of heat can be retained within the roaster oven 10 while tending to the foodstuffs with the hinged portion 40b in the open position than would otherwise be retained if the lid 40 were completely removed. In this way, the lid 40 aids in heating foodstuffs and keeping foodstuffs warm during serving.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention.

I claim:

1. A roaster oven for heating foodstuffs, the roaster oven comprising:
an outer housing having a bottom wall and a sidewall extending upwardly therefrom to define a cavity, a rim extending inwardly from the sidewall to define an opening to access the cavity;
an interior surface for contact with and containment of foodstuffs positioned within the cavity and accessible through the opening, the interior surface having a plurality of compartments for separating foodstuffs during heating;
a heating element disposed proximate the interior surface for heating the interior surface;
a control mechanism operably connected with the heating element to enable a user to control the temperature of the heating element; and
a lid removably positioned on the rim for at least partially covering the opening when the lid is positioned on the rim, the lid having a stationary portion and a movable portion, the movable portion being pivotable relative to the stationary portion, the movable portion having an open position in which at least a portion of the interior surface is accessible and a closed position in which the lid substantially covers the opening, each of the compartments being accessible when the movable portion is in the open position.

2. The roaster oven of claim 1 wherein the lid is generally rectangular and is cut along a line to divide the lid into the stationary portion and the movable portion.

3. The roaster oven of claim 2 wherein the stationary portion is substantially a first half of the lid and the movable portion is substantially a second half of the lid.

4. The roaster oven of claim 1 wherein the stationary portion has a first handle for lifting the lid, the first handle also acting as a stop surface against which the movable portion is rested when in the open position.

5. The roaster oven of claim 1 wherein the movable portion is comprised of a hinged portion.

6. The roaster oven of claim 1 wherein the control mechanism is disposed within the housing, the control mechanism being accessible from outside of the roaster oven.

7. The roaster oven of claim 1 wherein the movable portion is pivotably mounted to the stationary portion by at least one hinge.

8. The roaster oven of claim 7 wherein the at least one hinge is comprised of a first hinge and a second hinge, the first and second hinges located on the pivot axis and mounted to the stationary portion and the movable portion.

9. The roaster oven of claim 8 wherein the first and second hinges are mounted between opposing bottom edges of the stationary and movable portions.

10. The roaster oven of claim 1 further comprising:
a second lid handle mounted to the movable portion.

11. The roaster oven of claim 1 wherein a bottom edge of the lid is in facing engagement with the rim of the outer housing in the closed position.

12. The roaster oven of claim 1 wherein a bottom edge of the stationary portion is in facing engagement with the rim of the outer housing and a bottom edge of the movable portion is spaced from the rim of the outer housing in the open position.

* * * * *